United States Patent [19]

Petershack

[11] 4,353,459
[45] Oct. 12, 1982

[54] CONVEYOR CHAIN

[75] Inventor: Victor D. Petershack, Elm Grove, Wis.

[73] Assignee: Rexnord Inc., Milwaukee, Wis.

[21] Appl. No.: 125,593

[22] Filed: Feb. 28, 1980

[51] Int. Cl.³ .................. B65G 17/06; B65G 17/38
[52] U.S. Cl. .................. 198/852; 59/91; 474/210
[58] Field of Search .................. 198/850–853, 198/831, 804; 403/162–163, 291, 220, 152; 474/228, 62, 210, 161, 213, 207, 155–157; 59/85, 90, 91

[56] References Cited

U.S. PATENT DOCUMENTS 3,231,069 1/1966 Lanham .................. 198/853

FOREIGN PATENT DOCUMENTS 120867 1/1946 Australia .................. 198/851
1083379 9/1967 United Kingdom .................. 198/851

Primary Examiner—John J. Love
Assistant Examiner—Douglas D. Watts
Attorney, Agent, or Firm—Theresa F. Camoriano; Vance A. Smith

[57] ABSTRACT

An endless conveyor chain is a sequential assembly of block links formed of a polymeric material, interconnected by thin fleixble links of undulated shape, formed of either metallic or polymeric material, which are easily capable of flexing through their thicknesses, making it possible for the chain to negotiate lateral turns in the conveying run by producing edgewise flexure in the links. Large bearing stresses, which normally result in applications where chain joint lateral articulation occurs in nonlinear chain travel, are minimized or eliminated since the requisite lateral movement is allowed by flexure in the thin links away from the chain joints.

9 Claims, 4 Drawing Figures

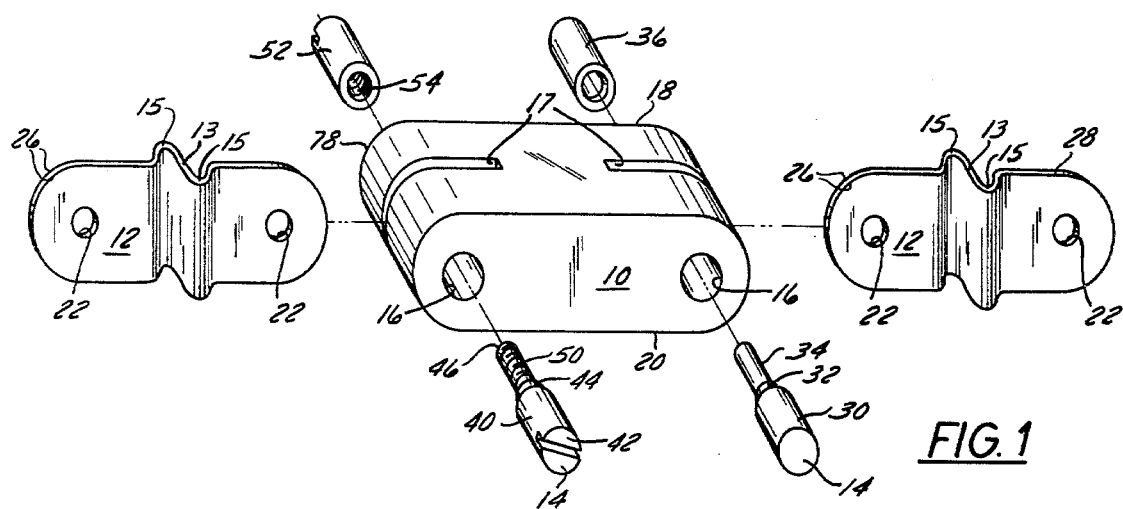
FIG. 1
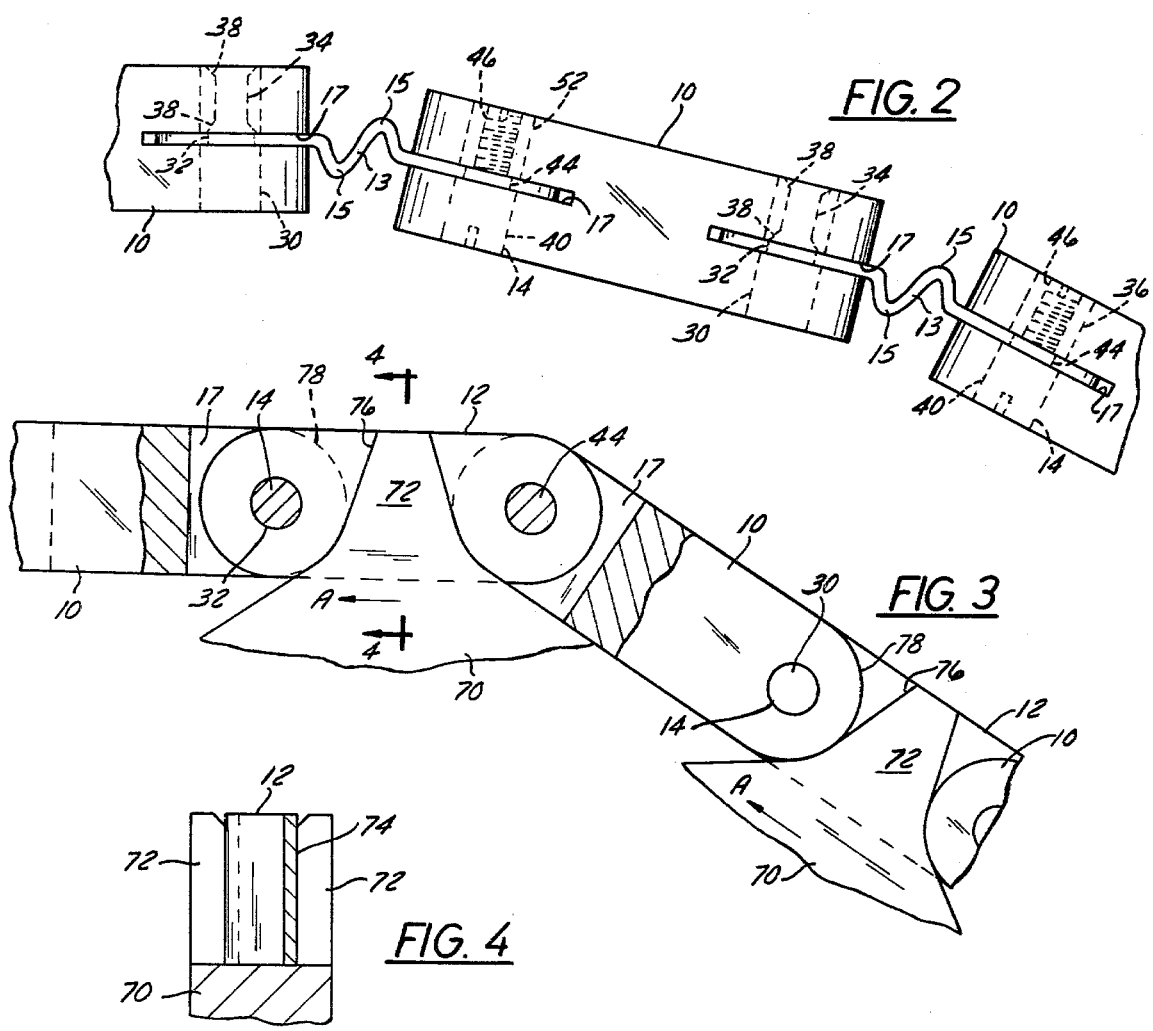
FIG. 2
FIG. 3
FIG. 4

CONVEYOR CHAIN

BACKGROUND OF THE INVENTION

1. Field of the Invention

This invention relates to conveyor chain and in particular to long courses of conveyor chain in systems that require lateral turns in the conveying path.

2. Description of the Prior Art

U.S. Pat. No. 3,282,121 is known to apply to the subject matter of this invention. It discloses a drive chain capable of driving a plurality of sprockets lying on diverse planes, and accomplishes this result through the use of flexible links capable of twisting about the longitudinal axis of the chain. Most chain has some capacity to twist, largely the result of manufacturing tolerances, which combine to produce clearances at the joints. When the clearances are taken up by rotation of mating parts relative to one another at each joint, the chain appears to twist. The apparent twisting results even though no link of the chain actually experiences torsion.

Conveyor chain has conventionally been fabricated from metal. Cost influences require that machining be maintained at minimum amounts; therefore, the chain is assembled as a composite of elements, each of which can be produced with minimum cost processes. This approach in metal, however, has the disadvantage of requiring a high parts count and greater weight than if plastic links were used. Other disadvantages are inherent in metal fabrication particularly where marring of the conveyed article is to be avoided. The use of plastic for certain chain components of this type can reduce the number of parts required, lighten the chain weight, reduce machining and avoid the marring problem. In addition, certain plastics are readily available in the commercial market, which, because of their inherent lubricious nature, can eliminate the need to lubricate chain, a particularly attractive advantage in certain markets where the conveyed article is sensitive to contamination, as in the food industry. The invention contemplates the disadvantages with the existing art and uniquely exploits the lubricious characteristics of plastic to provide a block link that contacts the sprocket tooth faces, and thereby eliminates the usual requirement for rolling contact between tooth and link.

When lateral turns are required in a conveyor system that has links formed of plastic, the standard metal chain link design must be modified to avoid large bearing stresses and wear points that arise at joints as they rotate relative to one another while in the turn. Plastic has an allowable bearing strength considerably less than conventional chain metal allowables. Unless suitably provided for, turns, which produce apparent chain bending, will develop bearing stresses among mating parts far in excess of plastic material allowables. Flexible link length is chosen upon taking due account of the material stiffness, thickness, width and end restraint conditions that are required to establish the edgewise bending flexibility compatible with the radius of curvature of the turns to be negotiated. The intent is to provide sufficient link bending flexibility so as to limit joint rotation, and thereby to minimize peak bearing stresses, that develop between mating parts at the joints.

In addition to overcoming the bearing stress problem where plastic links are used, the disclosed invention makes possible the attainment of other desirable plastic chain features while avoiding troublesome aspects of its use.

SUMMARY OF THE INVENTION

The invention, in contemplating improvements which the use of polymeric material could bring to chain design, operation and maintenance; proposes the use of a link, which combines the functions of bushings, sidebar links and rollers as they are presently employed in conventional roller chain design. Power is transferred from a split-tooth sprocket by way of bearing contact of the tooth directly on the polymeric link, herein called a block link. The need for rollers, which usually must be provided to allow sliding action between the sprocket tooth and connecting pins, is eliminated. Instead, the use of polymeric block link material, which has a sufficiently low coefficient of friction to allow sliding contact with the sprocket tooth face, can avoid the necessity of designing for rolling frictional contact between rollers and sprocket teeth. Consequently, bushings, upon which rollers are typically mounted, are not required in this conveyor chain.

In addition, a unique connecting pin, compatible with the inventive objects, is disclosed for use with the polymeric block link chain. Load is transferred from link-to-link by bearing forces developing between surfaces of mating parts.

A thin flexible link, either unitary or comprising several lamina, connects the polymeric block links. This link is readily capable of bending through its thickness about a vertical axis, and therey allows the chain to make lateral turns along its conveying run. This capability is far in excess of that which conventional chain construction permits and is the result of bending flexure of the flexible link, rather than mere joint rotation wherein assembly tolerances are taken up.

To promote bending in the central portion of the flexible link and away from the joints connecting the flexible link and associated block links, the flexible link has an undulated shape resembling an S-curve. The combination of the S-curve geometry and the increased developed lineal distance of approximately 1.57 times the lineal distance of a relatively straight link over which the flexing stresses are absorbed, encourages redistribution of the stresses toward the central undulated zone of the flexible linksaway from the pressure points at extreme edges of the connecting block links reducing the wear rate at the connecting joints. The edge surfaces of the undulated S-curve also present a more continuous and stable conveying surface in the space between block links.

BRIEF DESCRIPTION OF THE DRAWINGS

FIG. 1 is an exploded perspective view of a block link, two mating flexible links and two types of connecting pins.

FIG. 2 is a top view of several chain links showing bending curvature in the flexible links.

FIG. 3 is a side view of the chain as it engages a sprocket.

FIG. 4 is a section taken of FIG. 3 at a sprocket tooth centerline.

DESCRIPTION OF THE PREFERRED EMBODIMENT

The chain shown in FIGS. 1 and 2 consists of an assembly of block links 10, flexible links 12 and connecting pins 14.

Each block link has an aperture 16 at each lengthwise end into which are fitted the connecting pins 14. A longitudinal slot 17 is formed at each end of the block links, is positioned approximately coincidently with the longitudinal centerline of symmetry and has a width slightly in excess of the flexible link thickness. The slot depth is sufficient to allow rotation of the flexible link end within the slot while rotating about the axis of the block link apertures 16. The block link has planar surfaces on its upper 18 and lower 20 periphery to provide a suitable mounting surface on which conveyed articles can be placed for transport along the conveyor run and to support the chain as it slides along a floor or table in its course of travel.

The flexible link 12 has laterally aligned apertures 22 at each lengthwise end into which are fitted the connecting pins 14. It is essential that the pins be prevented from turning in the flexible links 12, and this is generally accomplished by employing a relatively high press fit between the flexible links and the pins, which extend through the apertures in these links. Other methods are available to prevent this turning; one such method provides for a welded connection along the line formed by the pin periphery at the intersection with the flexible link surfaces. The flexible links have a width somewhat less than the block link width so that interferences with the conveyed article while resting on the support surface 19 of the block link is avoided. Generally the flexible links have outer surfaces 26 which are mutually parallel and have longitudinal edges 28 that are straight and aligned with the conveyor direction of travel. The plane of the flexible links in the assembled chain is substantially parallel to the plane of the slots 17 in the block links. Normally the slot and flexible link will be oriented in a vertical plane, and in this mode will allow lateral turns to be made in the conveying course. The slot and flexible link can, however, be disposed in any suitable plane and will readily accomodate turns normal to the link plane. Any material, including steel or aluminum, that is suitable for the particular application and its environment may be chosen for the flexible links. Fiber reinforced, composite materials having fiberglass, Boron, graphite, KEVLAR, etc. fibers supported by a plastic resin matrix are particularly well suited since they combine the physical characteristics of high tensile strength, low density and low effective bending modulus.

The flexible links 12 have an undulated shape to provide a conveying surface having an increased developed lineal distance compared to a relatively straight link between sequentially placed block links 10 and to promote flexing in the central portion 13 of the flexible links 12 and away from the chain joints. In the embodiment shown, the flexible links 10 have an S-curve substantially in the shape of a sinusoid providing a conveying surface in the same plane as the conveying surface portion of the block links 12. Flexing that occurs as the chain negotiates a turn tends to take place in the central portion 13 between the curved portions 15 of the S-curve. The central portion 13 can also be made thinner than the remainder of the flexible link 12 to further promote flexing in the central portion 13.

Connecting pins 14 function by transmitting axial tensile forces from link to link along the chain by way of bearing contact with the links and internal pin shear. The pins can either be permanently installed or capable of disconnection at certain joints where chain disassembly is desired.

FIGS. 1 and 2 show a pin typical of the permanently installed type, which includes two separate parts. An end cylindrical portion 30 has a diameter sized for sliding movement in the block link apertures 16 and has a length sized to fit along the aperture 16 on one side of the slot 17. A center portion 32 is sized for interference fit, press-fit or welded connection within the flexible link apertures 22. The portion 32 is positioned to approximately align with the slot 17 when the end portion 30 is positioned in the aperture 16. Furthermore, the length of portion 32 is made to approximate the thickness of the flexible link 12 while being somewhat less than the slot width. An extended end portion 34, mutually coaxial with the portions 30 and 32, is located at the pin end that is opposite the end portion 30 and extends outwardly from portion 32 a length approximately equal to the depth of the block link aperture 16 that is on the opposite side of the slot 17 from the end portion 30. A cap 36 having a cylindrical outer surface sized for slidable fit within the block link apertures 16 is press-fit over the extended end portion 34. The cap 36 inner surface is chamfered at its lengthwise extremities 38 to provide a lead to facilitate installation over the extended end portion 34.

A connecting pin of the removable type is shown also in FIGS. 1 and 2. An end cylindrical portion 40 is located within the block link apertures 16 similary as in the permanent pin installation, again with a slidable fit. The outwardly facing surface 42 has formed in it a slotted head, socket head or other means for restraining the pin against torque about its axis, as when screw threads are being engaged or disengaged. A center portion 44 is sized and positioned similarly as in the permanent installation for press fit engagement with the flexible link apertures 22. An extended end portion 46 extends outwardly from the center portion 44 similarly as previously described, except that its outer cylindrical surface 48 has screw threads 50 formed thereon. A cap 52 having a bore with internal screw threads 54 formed therein engages the threads on the extended portion 46 and has a slidable-fit engagement with the block link apertures 16. The cap 52 is provided with a slotted head, socket head or other means for restraint against torque developed on engaging or disengaging the threads.

At the extremities of the conveyor run, the chain generally rotates about a sprocket shaft whose rotation necessarily requires the chain to have capability for link-to-link relative rotation about an axis transverse to the conveying direction. Power is transferred to the chain at a sprocket 70 shown in typical form, in FIGS. 3 and 4, with the sprocket teeth 72 engaging the outer contour 78 of the block links 10. Provision is made for the flexible links 12 to extend through a slot 74 formed at or near the middle of the tooth center. Drive, as indicated by vector A, is transferred by the bearing action of the tooth face 76 on the contour 78, by shearing within the pin 14, and by tension in the flexible link 12 as the load is carried to the next, trailing block link 80.

I claim:
1. A conveyor chain comprising:
 (a) A plurality of block links having a transverse hole near each lengthwise end, connected together in end-to-end relation;
 (b) A plurality of flexible links, each flexible link comprising a thin longitudinal mamber having a transverse hole near each lengthwise end, each thin longitudinal member being positioned between and forming the primary connection between successive block links, each flexible link hole being aligned with a block link hole in successive block links; said flexible links having an undulated shape at their central portion so as to promote lateral flexing of the chain in the central portions of said flexible links and away from said block links; and (c) Attachment means engaging said block link holes and said flexible link holes for joining said block links to said flexible links.

2. A conveyor chain comprising:
(a) A plurality of block links having a transverse hole near each lengthwise end, connected together in end-to-end relation;
(b) A plurality of flexible links having a transverse hole near each lengthwise end, each flexible link being positioned between and forming the primary connection between successive block links, each flexible link hole being aligned with a block link hole in successive block links; said flexible links having an undulated shape at their central portion; and
(c) Attachment means engaging said block link holes and said flexible link holes for joining said block links to said flexible links,
wherein each of said block links has a lengthwise slot extending from each lengthwise end.

3. A conveyor chain as defined in claim 2 wherein said slots are sized to accept the ends of said flexible links and said slots are in a plane substantially parallel to the plane of said flexible links.

4. A conveyor chain as defined in claim 1 wherein the undulated shape of said flexible link is an S-curve, substantially in the shape of a sinusoid.

5. A conveyor chain as defined in claim 2 wherein the undulated shape of said flexible link is an S-curve and the central portion of said S-curve is thinner than the remainder of said flexible link.

6. A conveyor chain comprising:
(a) A plurality of block links having a transverse hole near each lengthwise end, connected together in end-to-end relation;
(b) A plurality of flexible links having a transverse hole near each lengthwise end, each flexible link being positioned between and forming the primary connection between successive block links, each flexible link hole being aligned with a block link hole in successive block links; said flexible links having an undulated shape at their central portion; and
(c) Attachment means engaging said block link holes and said flexible link holes for joining said block links to said flexible links, comprising a pin having a circular cylindrical outer surface for engagement with said block link holes and said flexible link holes,
wherein said pin further comprises a first end portion having an outer diameter sized for slipfit engagement with said block link holes, and having a length approximately equal to the block link thickness on one side of said slot; a center portion having a diameter sized for press fit engagement with said flexible link holes, having a length slightly in excess of the thickness of said flexible link and being capable of mounting said flexible link thereon; a second end portion located at the opposite end of said attachment from first end portion, having a circular cylindrical outer surface coaxial with said first end portion and said center portion and having a length approximately equal to the block link thickness on the opposite side of said slot from said block link thickness that is engaged by said first end portion and a cap coaxial with said pin having an inside diameter in press fit engagement with the outside diameter of said second end portion, having an outside diameter sized for sliding fit engagement with said block link holes, and having a length approximately equal to the length of said second end portion.

7. A conveyor chain comprising:
(a) A plurality of block links having a transverse hole near each lengthwise end, connected together in end-to-end relation;
(b) A plurality of flexible links having a transverse hole near each lengthwise end, each flexible link being positioned between and forming the primary connection between successive block links, each flexible link hole being aligned with a block link hole in successive block links; said flexible links having an undulated shape at their central portion; and
(c) Attachment means engaging said block link holes and said flexible link holes for joining said block links to said flexible links, comprising a pin having a circular cylindrical outer surface for engagement with said block link holes and said flexible link hole,
wherein said pin comprises a first end portion having an outer diameter sized for slip fit engagement with said block link holes and having a length approximately equal to the block link thickness that is on one side of said slot; a center portion having a diameter sized for press-fit engagement with said flexible link holes, having a length slightly in excess of the thickness of the flexible link, and being capable of mounting said flexible link thereon; a second end portion located at the opposite end of said attachment from said first end portion having a circular cylindrical outer surface, coaxial with said first end portion and said center portion, having first screw threads formed thereon, and having a length approximately equal to the block link thickness on the opposite side of said slot from the block link thickness that is engaged by said first end portion; and a cap having an inside bore in which second screw threads are formed for engagement with said first screw threads, having an outside diameter sized for sliding fit engagement with said block link holes, and having a length approximately equal to the length of said second end portion.

8. A conveyor chain as defined in claim 7 wherein the undulated shape of said flexible links is an S-curve.

9. A conveyor chain as defined in claim 8 wherein the central portion of said S-curve is thinner than the remainder of said flexible link.

* * * * *